(12) United States Patent  
Sandstrom

(10) Patent No.: US 7,333,511 B2  
(45) Date of Patent: Feb. 19, 2008

(54) DYNAMICALLY CHANNELIZABLE PACKET TRANSPORT NETWORK

(75) Inventor: Mark Henrik Sandstrom, San Francisco, CA (US)

(73) Assignee: Optimum Communications Services, Inc., Edmonton (CA)

( * ) Notice: Subject to any disclaimer, the term of this patent is extended or adjusted under 35 U.S.C. 154(b) by 1066 days.

(21) Appl. No.: 10/230,698

(22) Filed: Aug. 29, 2002

(65) Prior Publication Data

US 2004/0042495 A1    Mar. 4, 2004

(51) Int. Cl.  
*H04J 3/16* (2006.01)

(52) U.S. Cl. .................. 370/468; 370/235; 370/257

(58) Field of Classification Search ........ 370/229–235, 370/252, 253, 257, 402, 403, 468  
See application file for complete search history.

(56) References Cited

U.S. PATENT DOCUMENTS

| | | | |
|---|---|---|---|
| 4,587,651 A * | 5/1986 | Nelson et al. .............. | 370/405 |
| 6,108,306 A * | 8/2000 | Kalkunte et al. ........... | 370/235 |
| 6,157,656 A * | 12/2000 | Lindgren et al. .......... | 370/458 |
| 6,195,332 B1 | 2/2001 | Tang | |
| 6,246,692 B1 | 6/2001 | Dai et al. | |
| 6,542,511 B1 | 4/2003 | Livermore et al. | |
| 6,556,548 B1 | 4/2003 | Kirkby et al. | |
| 6,631,128 B1 | 10/2003 | Lemieux | |
| 6,667,956 B2 | 12/2003 | Beshai et al. | |
| 6,697,373 B1 * | 2/2004 | Sandstrom .................. | 370/405 |
| 6,741,572 B1 | 5/2004 | Graves et al. | |
| 6,813,277 B2 * | 11/2004 | Edmon et al. .............. | 370/442 |
| 6,826,160 B1 * | 11/2004 | Wang et al. ................ | 370/329 |
| 6,973,504 B2 | 12/2005 | Nomura | |
| 7,042,892 B2 | 5/2006 | Young et al. | |
| 2005/0174948 A1 | 8/2005 | Isonuma | |
| 2006/0182144 A1 | 8/2006 | Dove | |
| 2007/0053369 A1 | 3/2007 | Mizutani | |

* cited by examiner

*Primary Examiner*—Chi Pham  
*Assistant Examiner*—Phuc Tran  
(74) *Attorney, Agent, or Firm*—Fenwick & West LLP

(57) ABSTRACT

A communications network for transporting data packets among L2/L3 nodes based on dynamically L1-channelizable multi-source buses. The dynamic channelization of a packet transport bus among source-node-specific L1 connections is managed by a bus control process, which periodically optimizes the allocation of bus capacity pool among the source nodes based on real-time bus capacity demand figures by the source nodes of the bus. The invention provides means for real-time dynamic, traffic load adaptive allocation of transport network capacity to continuously maximize the data throughput of the transport network for dynamic packet traffic, such as Internet traffic.

41 Claims, 7 Drawing Sheets

DYNAMICALLY CHANNELIZABLE PACKET TRANSPORT NETWORK

CROSS-REFERENCES TO RELATED APPLICATIONS

The subject matter of this application is related to and makes references to the following patent applications:

[1] Co-pending U.S. utility patent application Ser. No. 09/938,014, filing date Aug. 24, 2001, by Mark Henrik Sandstrom, entitled "A System and Method for Maximizing the Traffic Delivery Capacity of Packet Transport Networks via Real-time Traffic Pattern Based Optimization of Transport Capacity Allocation";

[2] U.S. provisional patent application Ser. No. 60/347975, filing date Oct. 19, 2001, by Mark Henrik Sandstrom, entitled "Intelligent Transport Network";

[3] U.S. provisional patent application Ser. No. 60/356503, filing date Feb. 11, 2002, by Mark Henrik Sandstrom, entitled "Real-time Control-Plane for Maximizing Billable-Traffic-Throughput of Packet Transport Networks";

[4] Co-pending U.S. utility patent application Ser. No. 10/170,260, filing date Jun. 13, 2002, by Mark Henrik Sandstrom, entitled "Input-controllable Dynamic Cross-connect";

[5] Co-pending U.S. utility patent application Ser. No. 10/192118, filing date Jul. 11, 2002, by Mark Henrik Sandstrom, entitled "Transparent, Look-up-free Packet Forwarding Method for Optimizing Global Network Throughput Based on Real-time Route Status";

[6] U.S. provisional patent application Ser. No. 60/400880, filing date Aug. 5, 2002, by Mark Henrik Sandstrom, entitled "Intelligent Transport Network Service Delivery Platform";

which are herein incorporated in their entirety by reference.

This application further claims the benefit under 35 U.S.C. § 119(e) of U.S. provisional application Ser. No. 60/356503 [3], and U.S. provisional patent application Ser. No. 60/400880 [6], which are herein incorporated in their entirety by reference.

BACKGROUND OF THE INVENTION

1. Technical Field

The present invention pertains to the field of communications networks, in particular to the field of packet transport networks.

2. Description of the Related Art

| | List of acronyms: |
|---|---|
| BC | Bus control process Cycle |
| BEB | End-Of-Bus |
| L1 | ISO OSI Stack Protocol Layer 1 |
| L2 | ISO OSI Stack Protocol Layer 2 |
| L3 | ISO OSI Stack Protocol Layer 3 |
| LEC | Local Exchange Carrier |
| MPLS | Multi-Protocol Label Switching, IETF RFC 3032 |
| ISP | Internet Service Provider |
| IP | Internet Protocol, IPv4: IETF RFC 791, IPv6: IETF FRC 2460 |
| POP | Point Of Presence |
| POS | Packet Over SDH/SONET |
| PPP | Point-to-Point Protocol, IETF RFC 1661 |
| QoS | Quality of Service |
| SDH | Synchronous Digital Hierarchy, ITU-T Recommendation G.707 |
| SONET | Synchronous Optical Network, a subset of SDH used in North America |

To provide deterministic QoS for packet switched data traffic, such IP traffic, the communications service provider needs to be able to guarantee pre-definable connectivity parameters between the communicating sites. A conventional way to provide guaranteed connection bandwidth between two sites is to provide a dedicated Layer 1 or Layer 0 point-to-point connection between the two sites. Such a network architecture based on non-shareable connections is however inefficient for bursty packet traffic, since the bandwidth reserved for the dedicated point-to-point connections is wasted when not used for communication between the two sites at the two ends of the point-to-point connection; none of the point-to-point link bandwidth can be used to carry other potential billable traffic even when not needed by traffic between the two sites connected by the point-to-point link. When guaranteed connectivity is needed among more than two sites, such as POPs of an ISP, the dedicated point-to-point link based network architecture is even more inefficient.

As an example of the inefficiency of the dedicated point-to-point connection based network architecture, consider a case where a group of five POP-routers would need guaranteed interconnectivity. Assume further that each one of the five POP routers has 10 Gbps of aggregate full-duplex traffic forwarding capacity between its local access ports and the other four POPs within the group. However, that 10 Gbps of traffic forwarding capacity pool of a POP router needs to shareable among the traffic from the four other POPs, with any potential momentary capacity breakdown pattern supported. For instance, identifying the five POPs as POP A, B, C, D and E, the egress packet traffic forwarding capacity demand break-down at the POP E at some five millisecond time window could be as per Table 1 below:

TABLE 1

An assumed breakdown of the 10 Gbps egress traffic forwarding capacity pool of POP E router among the source POPs A-D over a 5 ms period such that maximizes the billable traffic throughput for POP E egress traffic.

| Time/ms | A | B | C | D |
|---|---|---|---|---|
| 1 | 2.5 | 2.5 | 0 | 5 |
| 2 | 1 | 5 | 1 | 3 |
| 3 | 0 | 10 | 0 | 0 |
| 4 | 0.5 | 5 | 0.5 | 4 |
| 5 | 2.5 | 2.5 | 2.5 | 2.5 |

As illustrated in Table 1 above, in an extreme scenario, the full egress forwarding capacity pool of a POP router may be demanded by a single one of the group of directly interconnected POPs. Thus, in order to not limit the traffic delivery capacity of the network between the five POPs, the inter-POP network needs to be able to guarantee up to full 10 Gbps of available bandwidth between each pair of the POPs when so demanded by the inter-POP traffic load patterns. Therefore, with the dedicated point-to-point link based network architecture, four two-directional 10 Gbps point-to-point links are needed per each POP router to guarantee the required connectivity with the rest of the five POPs. As a result, 5×4=10 protected i.e. total of twenty 10 Gpbs inter-POP connections would be needed. Thus, whereas the inter-POP network serves only 10 Gbps per POP i.e. in total 50 Gbps of service interface capacity, a total of 20×10 Gbps=200 Gbps of physical network capacity is needed to support that service interface capacity. Note also that a network alternative wherein the 10 Gbps (corresponding to a STS-192c POS link) egress packet forwarding capacity pool of each of the POP routers is statically broken into four 2.5 Gbps (STS-48c POS link) connections from each one of the four remote POPs would be blocking up to 10 Gbps-2.5 Gbps=7.5 Gbps worth of billable traffic per POP, thus wasting up to 75% of the traffic forwarding capacity of the POP routers.

Obviously, the dedicated link-based network architecture is the more inefficient the greater the number of sites to be interconnected is. Though the above example assumed the sites to be ISP's POP routers, the sites could equally well be aggregator switches or routers of LECs or other type of communications or applications service providers, or enterprise border routers.

A conventional solution to the above inefficiency and scalability problem of building multi-site interconnect networks based on non-shareable inter-site links is to interconnect the sites through a central packet-switch, instead of directly to each other in a full-mesh fashion. However, in order to not deteriorate the network QoS from the level of direct site-to-site full-mesh, a dedicated central switch is needed for each such client network. Furthermore, in order to avoid the central switch from forming a global single-point-of-failure, each central switch needs to be doubled for protection. It is clear that ensuring QoS via such per-subscriber-dedicated and redundant link and switch based communications networks looses the economical advantage of providing connectivity over multi-subscriber shared public Internet, and thus does not improve the cost-efficiency of packet networking. Rather, such per-client-dedicated networks merely trade off the cost advantage of shared packet-switched Internet to gain better QoS for the client networks.

It should further be understood that the above reasoning applies not only to client-dedicated networks based on per-client-dedicated L1/L0 network connections and switches, but equally well also to packet-layer (L2/L3) virtual private networks (VPNs) that still require reserving network resources at the packet layer for each inter-site connection per each client separately in order to guarantee site-to-site connectivity parameters i.e. provide deterministic QoS. Providing the required QoS per each client network by using shared L1/L0 connections and packet-switches and reserving adequate capacity at the packet layer rather than by using per-client-dedicated connections and switches may enable finer granularity of capacity allocation, but that comes with the cost of significantly more complex and costlier packet-layer network elements. Thus, the L2/L3 VPNs also appear to create another trade-off between performance and cost advantage, and do therefore not produce a clear cost-efficiency improvement.

To summarize, while networks based on conventional dedicated L1 point-to-point circuits are often prohibitively inefficient for bursty packet traffic, conventional L2 (or above) shared packet-switched networks are not able to provide deterministic QoS without compromising the bandwidth efficiency of packet-switching, by reserving capacity for the connections requiring guaranteed throughput, and without making the packet-switched network infrastructure more costlier.

However, as the demand for reliable packet-based communications services is growing, driven in particular by Internet-related applications, communications service providers need to be able to provide deterministic and sufficiently good QoS also for packet-based communications services cost-effectively. There thus is a strong demand for a new technique that enables to provide multiple private-like networks for multi-sited clients using economical, multi-client-shared network infrastructure. Such new technique should provide the performance and QoS of a network based on dedicated L1 point-to-point connections among the sites of each client, with the cost advantage of using packet-layer (L2+) shared network resources, and without increasing the cost of such packet-switched network infrastructure.

BRIEF SUMMARY OF THE INVENTION

The present invention enables to provide multiple independent, i.e. private-like, site-to-site mesh subnetworks for multi-sited clients over a common shared network infrastructure, without requiring neither per-client-dedicated switches nor dedicated site-to-site connections. The invention thereby enables providing the desired connectivity, i.e. guaranteeing a required minimum bandwidth while providing the ability to dynamically utilize all the available bandwidth, among the client sites with minimized total network capacity usage. Thus the invention effectively combines the QoS of dedicated L1 point-to-point circuits with the network resource usage efficiency of L2/L3 packet-switching. The invention accomplishes that objective by providing means for provisioning flexible logical L1 topologies among a set of client sites, and by applying packet-switching within such isolated client subnetworks. The result is a set of client-specific subnetworks, called in the industry as virtual private networks (VPNs), provided over a common, L1-shared network infrastructure that operate independent of each other, and that require the theoretical minimum physical network capacity to provide the required connectivity among the sites of each subnetwork. The invention fully achieves the network capacity usage efficiency of packet-layer (L2/L3) VPNs, but it does not require the complex packet-layer processing switching systems required for packet-layer VPNs that substantially increase the cost of deploying and operating the network infrastructure.

The L1-separation of different VPNs provided by the present invention allows simplified, yet more efficient and feature-rich, packet-forwarding to be used within the individual packet-switched VPNs. Thus, rather than requiring more complex and expensive packet-switching systems, as do the conventional packet-layer VPNs that do not provide L1-separation between different VPNs and thus require deeper upper layer protocol processing to provide isolation among different VPNs, the present invention enables using more cost-efficient and scalable packet-switching schemes. Due to its novel dynamic L1 channelization within each multi-site VPN that provides direct, bandwidth-optimized L1-channels between the VPN access sites, the present invention requires packet-layer processing only for the VPN access interfaces, but not for the high-bit-rate backbone interfaces. Furthermore, a preferred embodiment of the present invention uses SDH/SONET virtual concatenation based L1 separation and channelization, thus providing flexible allocation of network capacity at L1.

The invention is based on dynamically L1-channelizable packet transport buses, a set of which can be configured over a standard, e.g. SDH/SONET/WDM, network infrastructure to provide a desired connectivity among a set of client sites.

For instance, with such dynamically L1-channelizable buses it is possible to provide out of a group of sites direct connections between such sites that need most mutual traffic exchange bandwidth, while connecting sites that need less mutual traffic exchange bandwidth through an intermediate forwarding point to optimize network resource utilization. Such a dynamically L1-channelizable packet transport bus, the subject matter of the present invention, provides a pool of network capacity for transport of packets from a set of source nodes to the destination node of the bus. The bus of the present invention provides a L1 channel with adjustable bandwidth from each of its source nodes to its destination node, and incorporates a real-time-dynamic control plane that periodically optimizes the allocation of the bus capacity pool among the source node specific channels based on the real-time packet-traffic-loads from the sources toward the destination of the bus, thereby continuously maximizing the data throughput of the network for the part of that bus.

DETAILED DESCRIPTION OF THE INVENTION

Figure 1:
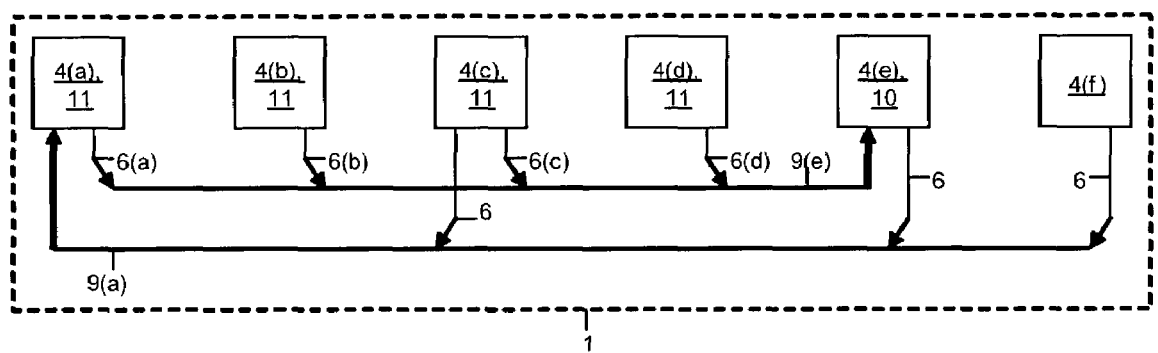
FIG. 1 presents a basic network diagram of a packet transport bus utilizing the architectural and operating principles of the present invention.

The invention is described herein first by illustrating the novel concepts via a more detailed discussion of the drawings, and then by providing specifications for a currently preferred embodiment of the invention.

Symbols and notations used in the drawings:

Lines and arrows between nodes, the nodes drawn as boxes, in the drawings represent a logical communication path, and may physically consist of one or more physical wires. When no direction is indicated, a line between nodes or boxes in the network diagrams presents a two-directional communication path.

Solid arrows indicate a communications signal i.e. data traffic flow. Gapped arrows indicate control information flow.

Bold lines indicate bussed communication paths, i.e. communication paths shareable by traffic flows from either various sources or to various destinations within the reach of the bus.

Lines or arrows crossing in the drawings are decoupled unless otherwise marked. Arrows ending into or beginning from a bus (a bold line) represent joining or disjoining of a sub-flow of data or control traffic into or from the bus, respectively.

Figure 2:
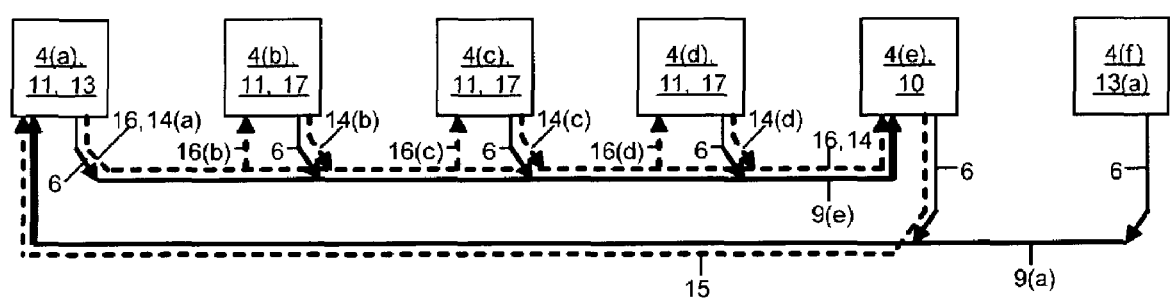
FIG. 2 presents control information flows for the bus of FIG. 1.

In FIGS. 1 and 2 the boxes represent network elements, such as packet-switch nodes.

Figure 3:
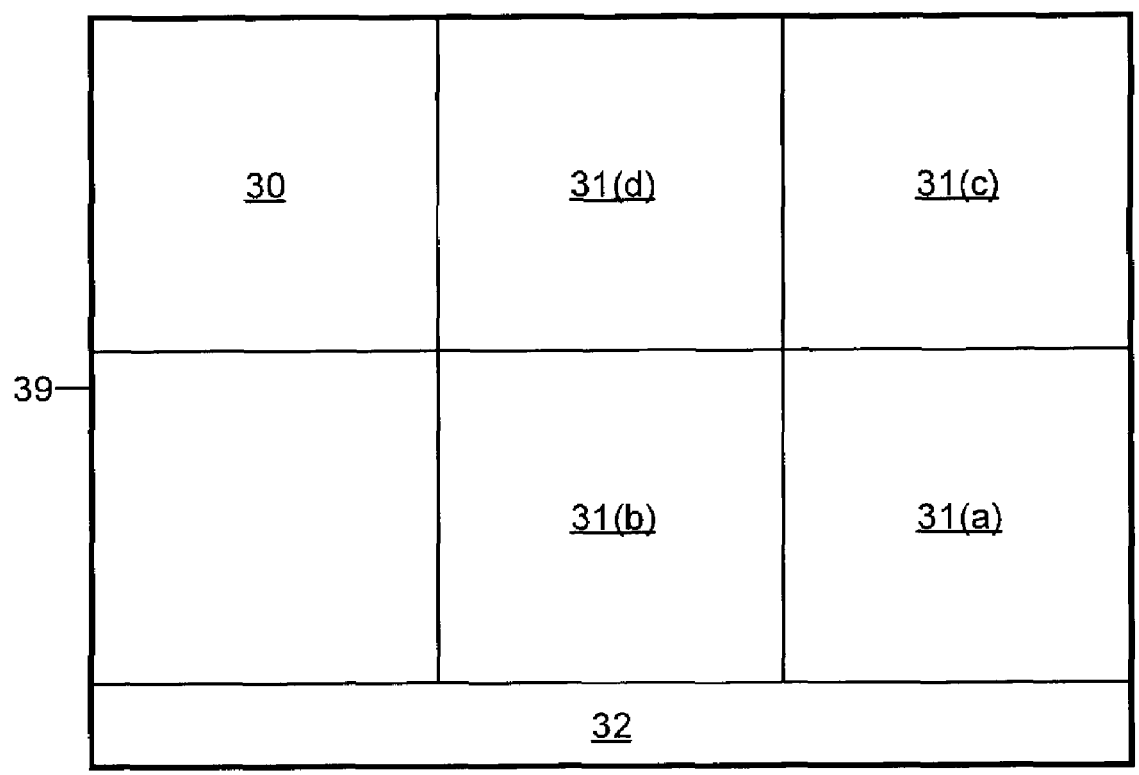
FIG. 3 presents a control payload carrying the control information flows of FIG. 2.
Figure 4:
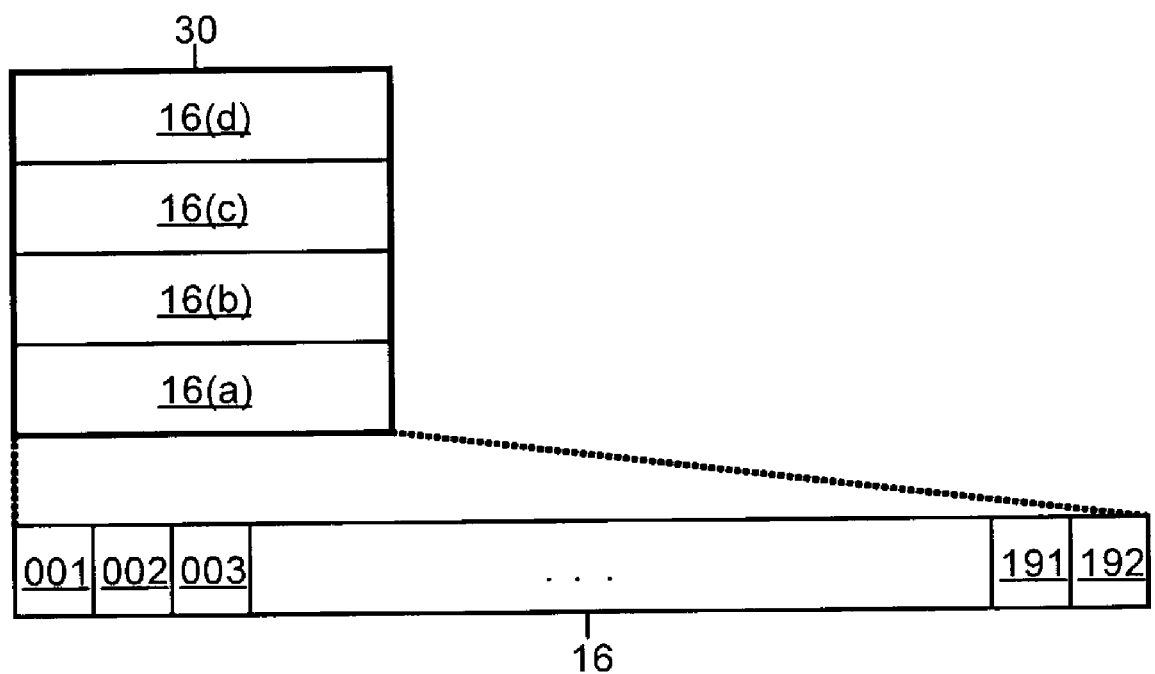
FIG. 4 presents a bus capacity allocation field within the control payload of FIG. 3.
Figure 5:
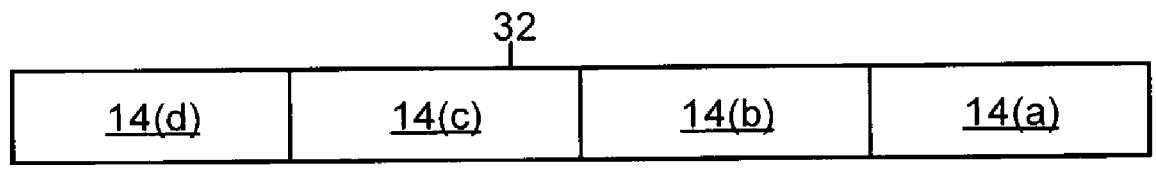
FIG. 5 presents a bus capacity demand field within the control payload of FIG. 3.

In FIGS. 3, 4 and 5 the boxes, such as 30 or 16(*b*), indicate information fields within a communications signal frame. In FIG. 4 the (semi-)vertical dotted lines between the boxes indicate that a subfield of an information field is presented below with a greater internal detail in an enlarged scale.

FIG. 1 presents a basic network diagram of network system 1 comprising a dynamically L1-channelizable, logical packet transport bus 9, the subject matter of the present invention. The bus 9 transports data packets, such as MPLS, IP, Frame Relay or Ethernet MAC packets, from its source nodes 4(*a*), 4(*b*), 4(*c*) and 4(*d*) to its destination node 4(*e*). Even though FIG. 1 presents an example case where the bus 9, the subject matter of the present invention, has four source nodes, such bus 9 can have any number of source nodes. The architectural and operating principles of different embodiments of bus 9 are accordant to the following description of the number of source nodes an embodiment of the bus 9 has.

The bus 9 provides a dedicated, packet-layer transparent, variable-bandwidth channel 6, such as 6(*b*), from each individual one of its source nodes 11 to its destination node 10. There is no packet-layer functionality, i.e. L2 or upper layer protocol functionality on the packet-layer-transparent, source node specific channels 6 on the bus 9 between a source node, such as 4(*b*), and the destination node 4(*e*); the channels 6 on the bus 9 are L1 connections. The capacity i.e. bandwidth of the individual source node specific channels 6 is adjusted by a control process controlling the bus capacity allocation based on the traffic loads from the source nodes 11 toward the destination node 10 of the bus 9, i.e. based on the bus capacity demand by the sources 11 of the bus 9, so that the sum of the capacities of the individual source node specific channels 6 on the bus 9 is equal to the aggregate capacity i.e. total bandwidth of the bus 9. In the example of FIG. 1, the sum of the capacities assigned for connections 6(*a*), 6(*b*), 6(*c*) and 6(*d*) is thus equal to the aggregate capacity of the bus 9(*e*).

For instance, if the aggregate capacity of the bus 9 is 192 STS-1s (equaling to an OC-192 SONET signal that provides approximately 10 Gbps of total bandwidth) the allocation of the 192 STS-1s of bus 9 capacity pool among its source nodes 4(*a*) through 4(*d*) during the 5 ms period studied in Table 1 (in the Background of the Invention section) would be as per Table 2 below:

TABLE 2

The allocation of the STS-1s of bus 9(e) capacity pool of STS-192 among its source node specific channels 6(a), 6(b), 6(c) and 6(d) for the 5 ms period studied in Table 1.

| Time/ms | 6(a) | 6(b) | 6(c) | 6(d) |
|---|---|---|---|---|
| 1 | 48 | 48 | 0 | 96 |
| 2 | 20 | 96 | 20 | 56 |
| 3 | 0 | 192 | 0 | 0 |
| 4 | 10 | 96 | 10 | 76 |
| 5 | 48 | 48 | 48 | 48 |

In a preferred embodiment of the bus 9, each one of the source node specific channels 6, i.e. 6(*a*) through 6(*d*) in FIG. 1, uses virtual concatenation of the capacity allocation units to form a single logical variable-bandwidth packet transport channel from each source node 11 to the destination node 10 of the bus 9. For instance, in a preferred embodiment, during the 2nd ms in the 5 ms time period of Table 2, the channel 6(*b*) from the source node 4(*b*) to the destination node 4(*e*) is a virtual concatenated STS-1-96v packet-over-SONET (POS) channel. In SDH terms, such a channel is called VC-3-96v or VC-4-32v packet-over-SDH.

Later on in this specification, a virtual concatenated packet-over-SONET/SDH (POS) channel of X STS-1s or VC-3s worth of capacity is referred to as STS-Xv or VC-3-Xv, wherein the concatenation coefficient X is an arbitrary integer variable in the range from 0 to the total aggregate capacity of the bus 9 in units of STS-1 or VC-3. Thus, in Table 2 the integers in the columns below the channel reference characters 6(*a*) through 6(*d*) in a preferred embodiment are the concatenation coefficients X for their associated STS-Xv channels on each millisecond period during the studied 5 ms window. The concatenation coefficients are modified i.e. recomputed by the bus control process for each new process cycle (which in a currently preferred embodiment is one millisecond i.e. eight SDH/SONET frame periods in duration) so as to maximize the data throughput of the bus.

Figure 6:
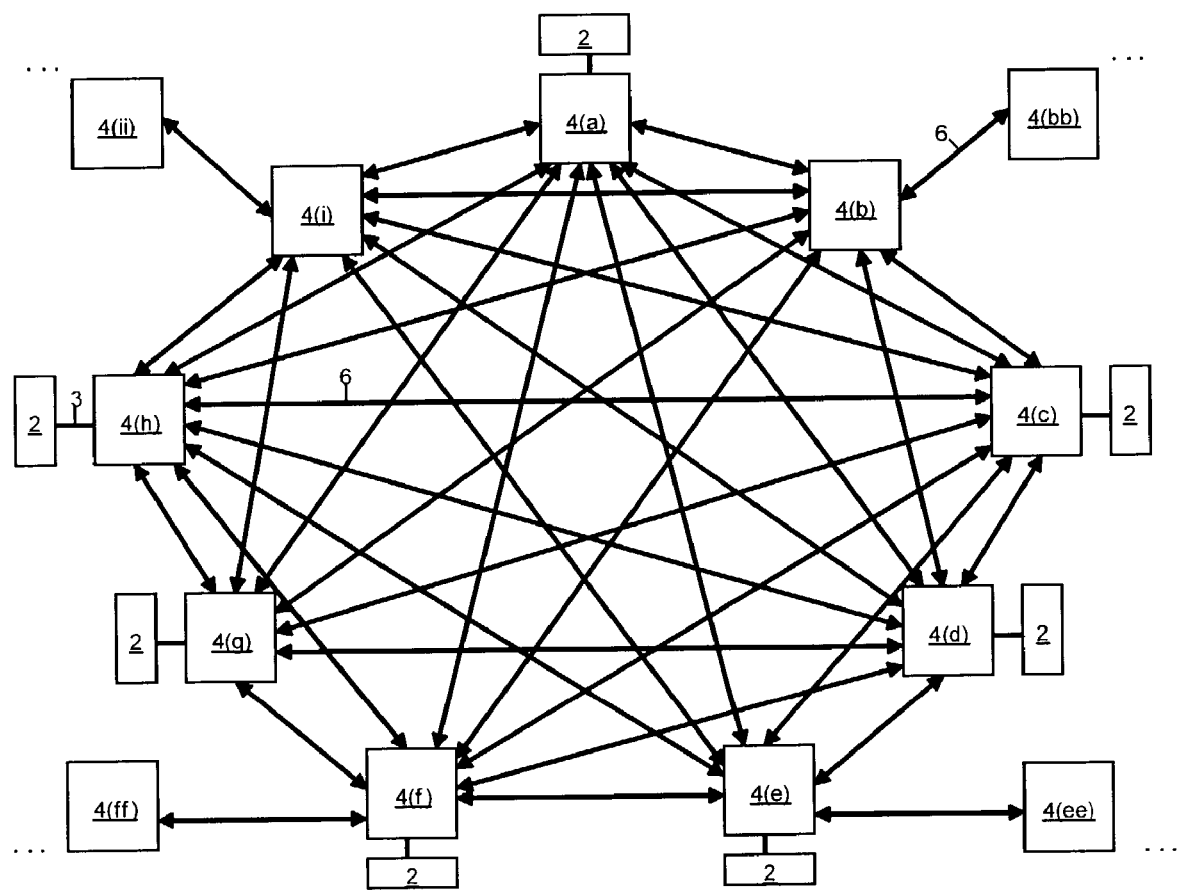
FIG. 6 presents an example network architecture based on buses of FIG. 1.
Figure 7:
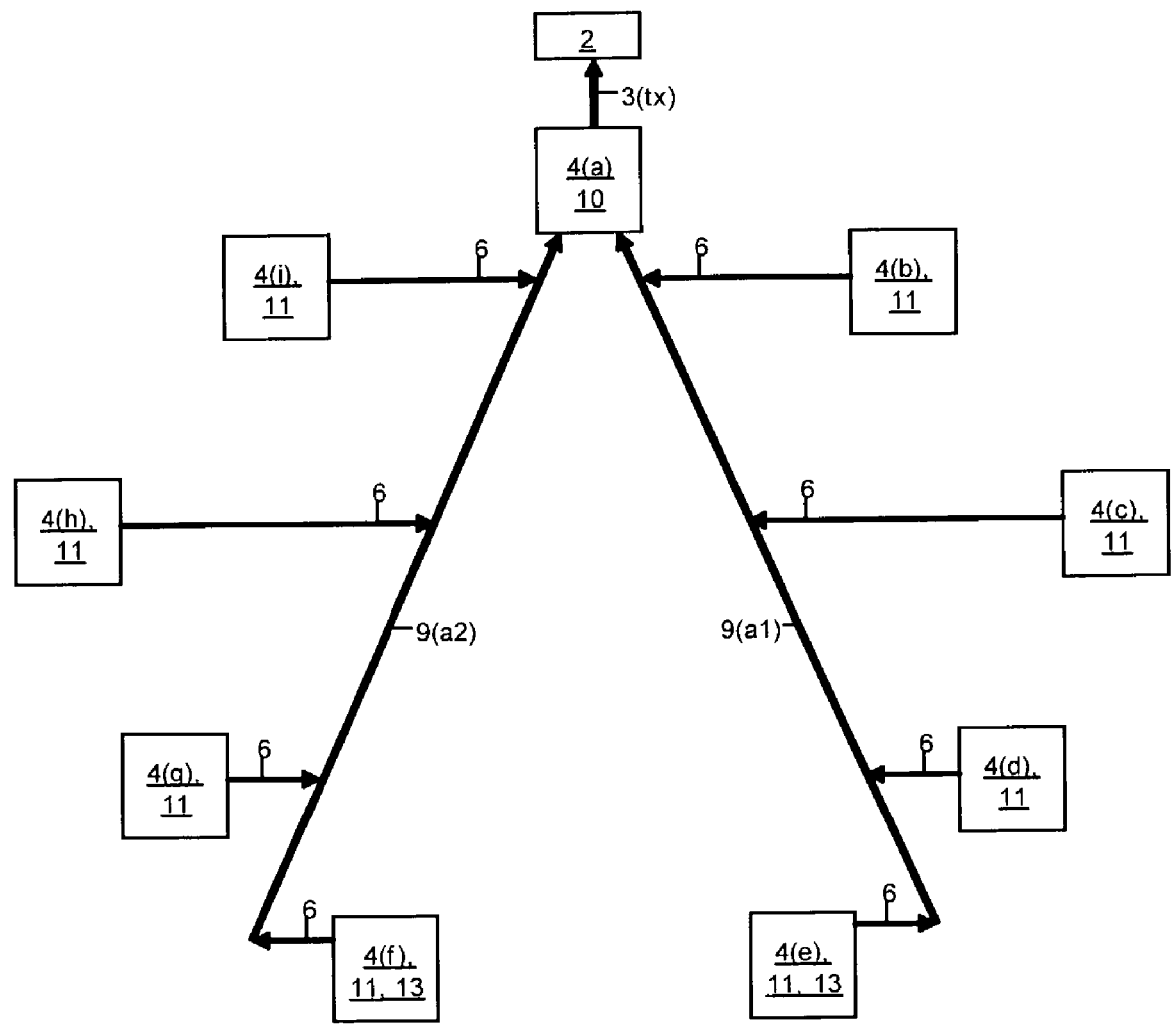
FIG. 7 presents a repeating portion the network of FIG. 6 in more detail.

The nodes 4 in FIG. 1 can be separate network elements, such as IP or MPLS routers, as well as they can be interface units of single system, e.g. interface units of a transport network system. Because a bus 9 within a network system 1 forms one functional entity, and since the subject matter of the present invention is a bus 9 (or a superstructure thereof as shown in FIGS. 6 and 7), said nodes 4 can be thought of also as interfaces of a network system 1 based on buses 9. Therefore, where the perspective is that of the operation of a bus 9 or network system 1 as a single entity, the nodes 4 could be better named as interfaces of a network system 1. In such cases, source nodes 11 are referred to as ingress interfaces, and destination nodes 10 referred to as egress interfaces of a network system 1 based on bus or buses 9. This specification however calls such interface units 4 consistently as nodes.

Naturally, the nodes 4 can have additional interfaces and functionality than what is shown in FIG. 1, which presents only their aspects directly related to the bus 9(*e*). Overall, buses 9 provide a flexible way for multiple types of network elements, such as aggregator and core L2/L3 switches and routers to efficiently exchange packet based data traffic. In case a node 4 was of the aggregator router type, it would have, in addition to its backbone interfaces on buses 9, a number of access interfaces toward end-users' Customer Premises Equipment (CPE); such access interfaces however are not shown in FIG. 1 since they conventionally do not use the bus 9 structure. It is worth to notice that arbitrary network topologies can be formed with buses 9; e.g., even if a set of two or more nodes 4 are sources on the same bus 9, it is not required that the member nodes of said set would need to be direct sources to each other. For instance, even though in FIG. 1 both the nodes 4(*e*) and 4(*f*) are direct sources on bus 9(*a*) to node 4(*a*), the node 4(*f*) is not required to be a source on any bus 9 to node 4(*e*). Note also that a node 4 can be the destination 11 on more than one bus 9, as well as a source 11 on several buses 9. In FIG. 1 the nodes 4(*a*) through 4(*e*) are labeled as a source node 11 or a destination node 10 with reference only to the bus 9(*e*). The presented direct connectivity, based on connections 6, among the nodes 4(*a*) through 4(*f*) in FIG. 1 serves just as one possible example out of multiple scenarios, ranging from many-to-one to any-to-any configurations.

This flexibility of allowing a node 4 to be a source and/or the destination at any of the buses 9 within a network system 1 enables to configure with buses 9 a desired connectivity among a set of nodes 4 in a network regardless of the geographic locations of the nodes and the physical network topologies, with minimized total network capacity requirement. It thus is possible using buses 9 to provide direct connections 6 between such pairs of nodes 4 that need most mutual traffic exchange capacity, while such sets of nodes 4 that have less traffic to exchange can be interconnected more economically through intermediate aggregation point nodes 4.

There are no restrictions regarding the location of nodes 4(*a*) through 4(*f*) in FIG. 1. Some or all of the nodes 4 can be located within the same physical network equipment, as well as the nodes can be in any distance from each other. The bus 9 can thus be implemented in whole or in part with electrical wiring, optical fiber, or any mixture thereof, as appropriate for each span of the bus 9 between the adjacent nodes 4. Furthermore, the different capacity i.e. bandwidth allocation units of the bus 9, such as the individual STA-1s of an STS-N (N is an arbitrary integer) bus, can be routed between the nodes 4 over different carrier signals or fibers. Naturally, a number of different buses 9, potentially with other type of signals and connections, can be provided over the same fiber network infrastructure.

FIG. 2 presents the essential control information flows for the packet transport bus 9 of FIG. 1. The bus control process, which periodically optimizes the bus capacity allocation pattern, i.e. allocates the bus pool of capacity allocation units to its individual source nodes 11 in order the maximize the rate of data delivered by the bus 9, is herein explained via describing the operation of the bus control information signaling scheme for one complete control process cycle on bus 9(*e*). In FIG. 2, as in FIG. 1, the nodes 4(*a*) through 4(*e*) are labeled with reference characters (10, 11, 13 and 17) considering only their position regarding the studied bus 9(*e*).

On every regular control process cycle on bus 9(*e*), the bus control signaling scheme comprises the following control information flows:

1) The bus capacity allocation info 15 is transferred from the destination node 4(*e*) of the bus 9(*e*) to its end-of-bus (EOB) 13 source node 4(*a*). This info 15 can be transferred from node 4(*e*) to node 4(*a*) on another bus 9, referenced with character 9(*a*), whose destination is the node 4(*a*). Note that the destination 10 of the studied bus 9(*e*), i.e. the node 4(*e*), can be but does not need to be the EOB source node 13(*a*) of the bus 9(*a*) on which the capacity allocation info 15 is transferred. This flexibility enables configuring both full-mesh and partial, spanning mesh topologies among nodes 4 with buses 9. Note further that the capacity allocation info 15 for bus 9(*e*) can be transferred from its destination node 4(*e*) to its EOB node 4(*a*) over any applicable means of data transmission, such as a standard SDH/SONET or Ethernet connection, i.e., the info 15 is not required to be transferred over a bus 9.

2) The EOB source node 4(*a*) of the studied bus 9(*e*) loops-back i.e. transmits on a pre-defined phase at each of its self-timed bus process cycle the capacity allocation info on the bus 9(*e*) in a specially marked data frame referred to as a control payload. The looped-back capacity allocation information flow from the EOB source node 4(*a*) of the bus 4(*e*) is identified in FIG. 2 with reference character 16. In a currently preferred embodiment the EOB source node 13 of a bus 9 transmits the control payload on the sixth SDH frame slot of the its internally-timed eight-frame-slot bus process cycle.

3) The downstream source nodes 17 and the destination node 10 along the bus 9(*e*) detect the control payload transmitted by EOB source node 4(*a*) traveling on the bus 9(*e*) through a specified control payload identification mechanism. In a preferred embodiment, where the bus 9 is a collection of STS-1 or VC-3 paths, and wherein the control payload is mapped into a C-3 payload of an SDH VC-3 frame (equal to SONET STS-1 SPE), the control payload is identified via a unique value in the path trail trace identifier byte in the POH byte J1 of the VC-3 frame carrying the control payload. Once a downstream node 17 detects a control payload on the bus 9, it i) copies its related capacity allocation info 16 from a specified field in the control payload, ii) inserts its capacity demand info 14 into an appropriate field in the control payload, and iii) synchronizes its bus process cycle timer to said predefined bus process cycle phase on which the EOB source node 13 transmits and on which the control payload nominally travels on the bus on each bus process cycle. The destination node 10 also copies the capacity allocation info 16 from the control payload, and synchronizes its local bus cycle timer same way the downstream nodes do.

4) At the beginning (on the first frame slot) of the next process cycle on the bus 9(*e*), as timed by the bus process cycle timers of the nodes 4(*a*)-4(*e*) of the bus, all of which are synchronized to the phase of the timer of the EOB source node 13 as per iii) of the above step 3), the nodes 4(*a*), 4(*b*), 4(*c*), 4(*d*) and 4(*e*) of the bus 9(*e*) in synchrony execute their related capacity allocation info that they copied from the control payload that traveled on the bus on the previous bus process cycle. The capacity allocation info per a source node, such as 16(*b*) for node 4(*b*) of bus 9(*e*), specifies for that particular source node the specific bus capacity allocation units out of the bus pool assigned to that source node for the next bus process cycle. The destination node 10(*e*) knows based on the capacity allocation info 16(*a*) through 16(*d*) how the bus 9(*e*) is channelized per the source-specific channels 6(*a*) through 6(*d*) (FIG. 1) on the next process cycle. In a preferred embodiment, wherein the bus capacity allocation units are the individual STS-1 paths of the pool of N (an integer multiple of) STS-1 paths that form the bus 9, the capacity allocation info 16 specifies which particular STS-1 resources were assigned to which source node. Naturally, the bus process cycle takes care of that every capacity allocation unit on the bus is assigned to exactly one source node specific channel 6 on any given bus process cycle. For instance, in the case of Table 2, on the fourth process cycle i.e. on the fourth millisecond in the studied 5 ms window, the ten STS-1s allocated to the source node 4(*c*) could be the STS-1s #71, #83, #99, #107, #112, #120, #133, #134, #188 and #191 out of the STS-192 bus 9(*e*) in that example.

5) As the control payload traveling down the bus 9(*e*) reaches its destination node 4(*e*), the destination node copies from the control payload the capacity demand info 14 inserted therein by the source nodes 4(*a*) through 4(*d*) of the bus 9(*e*), and based on that set of capacity demand info 14, computes a new capacity allocation 15 for the next process cycle. In a preferred embodiment, the algorithm computing the bus 9 capacity allocation 15 allocates the entire bus capacity for the next bus process cycle i.e. algorithm period so as to minimize the aggregate amount of unmatched demand 15 by the sources 11 of the bus 9, and to ensure fairness among the source nodes of the bus. The node 4(*e*) then inserts the capacity allocation info 15 on a control payload traveling on a bus whose destination is the EOB source node 4(*a*) of the bus 9(*e*), or uses another applicable mechanism to transfer the new capacity allocation info to its EOB source node 13, as per the discussion in step 1) above. Note that if the destination node 4(*e*) of bus 9(*e*) is an EOB source node 13 on a bus 9 on which the node 4(*a*) is the destination node, the node 4(*e*) transmits the control payload on that bus, as per the discussion in step 2) above.

FIG. 3 presents a currently preferred structure of a control payload 39 that is used to carry the control information flows 15, 16 and 14 of FIG. 2. As per the above discussion regarding FIG. 2, in particular the description of step 3), in a preferred embodiment the control payload is mapped into the C-3 field of a specially marked VC-3 frame carrying the control payload.

The information field 30 of control payload 39 is used to carry the looped-back i.e. second-pass capacity allocation info 16 from the EOB source node 13 to the downstream nodes 17 and the destination node 10 of a bus 9. The EOB source node 13 of a bus 9, which assembles and transmits the control payload 39 on a specified time once in every bus control process period, gets the capacity allocation info it loops back on the bus 9 from the destination node 10 of the studied bus 9.

The information fields 31 of control payload 39 are used to carry the to-be-looped-back i.e. first-pass capacity allocation info 15 to the destination node 10 of a bus 9 from such source nodes 11 of that bus 9 that are destination nodes on such other buses 9 that on which the destination node 10 of the bus on which the studied control payload 39 travels is the EOB source node. Though the example embodiment of control payload structure shown in FIG. 2 provides place for up to four individual first-pass capacity allocation information flows, marked with reference characters 31(*a*), 31(*b*), 31(*c*) and 31(*d*), in different applications a different quantity of fields 31 can be accommodated in control payloads 39.

The information field 32 of control payload 39 is used to carry the capacity demand info 14 from the source nodes 11 to the destination node 10 of the bus 9 on which the studied control payload travels.

The detailed internal structure of the bus control payload 39 and its sub-fields 30, 31 and 32 used in a preferred embodiment is specified in the referenced provisional patent application [3], wherein the bus 9 is referred to as Adaptive Virtual Concatenation Multiplexer Bus (AMB), and the control payload 39 as AMB Control Payload (ACP).

FIG. 4 shows a currently preferred internal structure for the bus capacity allocation information fields 30 and 31 of control payload 39 of FIG. 3, using the field 30 as an example. Note that the EOB source 13 of a bus 9 simply copies (loops back) the first-pass capacity allocation info fields 31 it receives from its destination nodes 11 into the second-pass capacity allocation fields 30 of the control payloads 39 it transmits on the appropriate buses 9, and thus the fields 30 and 31 have equal format. It is in FIG. 4 seen that the fields 30 and 31 are divided into source node specific subfields that carry the source node specific first- and second-pass capacity allocation info 16 and 15, respectively. In the control payload 39 traveling on the studied bus 9(*e*) the source node specific subfields of the information field 30 carry the second-pass capacity allocation info 16(*a*) through 16(*d*) for the source nodes 4(*a*) through 4(*d*) as shown in FIG. 2. The reference characters 14 and 16 are used in FIGS. 2 and 4 to refer both to the associated bus control information flow and the related information fields in the control payload 39. In a preferred embodiment, each of the source node specific capacity allocation subfields resides in its own row within its field 30 or 31 in the VC-3 frame carrying the control payload.

Each of the source node specific capacity information allocation subfields 16(*a*), 16(*b*), 16(*c*) and 16(*d*) has an internal structure similar to that shown for field 16(*a*) in FIG.

4. Each subfield 16 comprises a bit vector, i.e. a row of bits 001 through 192, wherein each bit specifies for the source node 11 to which the particular capacity allocation bit vector 16 is addressed to whether or not the capacity allocation unit on the bus 9 specified by the location of said bit is assigned to that said source node 11 on the next bus process cycle. Thus, the bits 001,002, etc. of a capacity allocation vector 15 or 16 present the capacity pool of bus 9 as a parallel array of its capacity allocation units, such as STS-1 channel resources of an STS-192 bus 9. For instance, if the bus 9(e) capacity pool is 192 STS-1s, the bit 002 of the subfield 16(b) specifies whether the STS-1 #2 on the logical STS-192 bus 9(e) is assigned to the source node 4(b). In a preferred embodiment, if a bit in the capacity allocation vector 16 is set to logic one, its corresponding bus capacity unit is assigned to the source node 11 to which the capacity allocation vector is computed for. Although, for the sake of consistency with the descriptions of FIGS. 1 and 2 and Table 2, the example of the capacity allocation information field 16 presented in FIG. 4 implies the vector 16 to comprise 192 bits, based on an assumed bus capacity pool of 192 capacity allocation units, in different applications the capacity allocation vectors 16 may comprise different quantities of bits, corresponding to the number of capacity allocation units on the buses 9 at each different application.

The capacity allocation information subfields 16 of information field 30 of a control payload 39 are computed for the source nodes 11 of a bus 9 on which the studied control payload 39 travels by the destination node 10 of the bus 9 based on the capacity demand information field 32 inserted into the control payload 39 by said source nodes 11.

FIG. 5 shows a currently preferred internal structure for the bus capacity demand information field 32 of control payload 39 of FIG. 3. It is seen that the field 32 is divided into source node specific subfields 14(a) through 14(d). In the control payload 39 traveling on the studied bus 9(e) the source node specific subfields of the information field 32 carry the capacity demand info 14(a) through 14(d) by the source nodes 4(a) through 4(d) as shown in FIG. 2. In a preferred embodiment, each of the source node specific capacity allocation subfields resides in its own column within the field 32 in the VC-3 frame carrying the control payload. Each of the source nodes 11 of a bus 9 inserts its bus capacity demand figure (in bus capacity allocation units) into their related sub-field in the field 32 of the control payloads 39 traveling on the bus 9. For instance, assuming the bus 9(e) of FIG. 2 has a capacity pool of 192 STA-1s, if the source node 4(b) had data traffic load toward node 4(e) that would demand twelve STA-1s for the next process cycle, the node 4(b) inserts a FIG. 12 ("1100" in a binary presentation) in its related subfield 14(b) in the information field 32 of control payload 39 traveling on the bus 9(e) toward its destination node 4(e). In a preferred embodiment a source node 11 determines its capacity demand FIG. 14 by translating its amount of data bytes queued (at the time the source node inserts its demand FIG. 14 in the control payload 39) in a buffer for future transmission toward the destination node 10 of a control payload 39 into such an amount of STS-1 (VC-3) slots on the STS-N (N is an arbitrary integer) bus 9 toward said destination node 10 that provides sufficient bandwidth in the bus process cycle (e.g. 1 ms) to transfer all the queued data buffered on said source node 11 for future transmission toward the destination node of the control payload. This process of quantifying a demand FIG. 14 in capacity allocation units, i.e. translating an amount of queued data bytes into a demand FIG. 14 expressed as an integer multiple of bus capacity allocation units (e.g. an STS-1 resource provides a capacity to transfer approximately 6192 data bytes in 1 ms) may naturally require rounding up or down the result of the division of the number of queued data bytes by transfer capacity per an allocation unit (e.g. eight STS-1 payloads) to closest full integer figure.

Though the FIGS. 3, 4 and 5 show a practical example of a bus control payload 39 and the information fields within it such that support up to four source nodes 11 per a bus 9, as the studied application of the control payload 39 relates to the bus 9(e) of FIGS. 1 and 2 that has four source nodes. However, structuring a control payload that supports a different, lesser or greater, number of source nodes 11 per a bus 3 is an obvious extension of the control payload information field structures shown herein. Basically, the number of information fields 31, 14, 15, and 16 within a control payload 39 needs to be adjusted to the maximum number of source nodes 11 per a bus 9. If necessary, the control payload information field 39 can be mapped to more than one physical transmission frame on bus 9.

Also, though FIGS. 4 and 5 present the capacity demand and allocation information fields in a plain, un-encoded, fashion, it is obvious that in an actual network implementation such control information fields may be encoded for transmission. Specifically, to provide protection against transmission bit errors, the single bits 001, 002, etc. of the capacity allocation vectors 16 in FIG. 4 can be replaced with 3-bit majority-vote-codes, and the capacity demand integer-figure fields 14(a), 14(b) etc. of FIG. 5 can be Cray-coded for transmission.

FIG. 6 presents an example network architecture based on buses 9 of FIG. 1. In FIG. 6 a number of external systems 2, which can be any mix of e.g. aggregator IP/MPLS routers or other L2 or upper layer network systems, or other bus 9-based network systems 1, are interconnected in a partial, spanning mesh fashion. For the sake of clarity of the drawing, only a few of the elements 3 and 6 are labeled with a reference character in FIG. 6; however, the reference character 3 relates to all external interfaces of a network system 1 between nodes 4 and external systems 2, and the reference character 6 relates to all internal interfaces of a network system 1 among nodes 4. The connections 6 in FIG. 6 drawn as two-directional arrows represent two regular connections 6, one in each direction, on two different buses 9. For the buses 9 of FIG. 6 it is assumed that a maximum of four sources are allowed per a bus 9, and that a node 4 can be the destination for up to two buses 9.

It is seen from FIG. 2 that for a bus 9 to be fully operational, the only requirement for mutual connectivity 6 among the nodes 4 (4(a) through 4(e) in FIG. 2) either as sources 11 or destination 10 on the bus 9, in addition to the connectivity 6 from the source nodes to the destination node of the bus, is that the destination node 10 has a connection to its EOB source node 13 on which to transfer the first-pass capacity allocation info 15. This flexibility of networks using buses 9 allows to provide direct connections 6 between such pairs of nodes 4, e.g. the nodes 4(a) and 4(b) in FIG. 6, that need most guaranteeable bandwidth for mutual traffic exchange, while it allows more economical network capacity usage by not requiring each pair of the nodes 4 that have a common direct destination, e.g. nodes 4(b) and 4(e), to have a direct mutual connection 6.

The connectivity 6 of the network example of FIG. 6 assumes that the node pairs 4(b) and 4(e), and 4(f) and 4(i), to not have need for direct L1 connectivity, and thus the buses 9 to nodes 4(b), 4(e), 4(f) and 4(i) have space for source nodes outside the nine node group of 4(a)-4(i). Thus, even with limitations such that a node four can be the destination 10 on at most two buses 9, and that a bus 9 can have at most four source nodes 11, an unlimited number of nodes 4, and remote systems 2 through them, can be interconnected with minimized total network capacity requirement so that direct L1 connectivity 6 can be arranged be arranged between such pairs of nodes 4 that require highest performing mutual connectivity, regardless of the geographical locations of such nodes 4 and the underlying physical network topology. On the other hand, such limitations however greatly reduce the implementational complexity of a network system 1, thus enabling a straightforward and economical system implementation. FIGS. 6 and 7 also show that even complex network systems interconnecting an unlimited number of nodes 4 and external systems 2, and that comprise spanning-mesh superstructures of buses 9, can be fully implemented with using only the relatively simple, independently operating, four-source-node-buses 9 described above regarding FIGS. 2 through 5.

FIG. 7 presents in more detail the portion of the network of FIG. 6 that relate to the connections 6 that transport data to an example one of the nodes 4, which example node is chosen to be the node 4(a). It should be noted however that the node 4(a) was chosen just as an example; it is no different than the rest of the nodes, nor is it in any special position regarding the other nodes 4 of FIG. 6. I.e., all the nodes 4 of FIG. 6, and the subnetworks on which their associated connections 6 are routed to them can be similar (though not required to be similar) to the subnetwork transporting data to node 4(a) shown in FIG. 7.

From FIG. 7 it is seen that even such buses 9 that have the same destination node 10 operate each completely independently, and there is no need for any type of mutual bus process cycle phase synchronization among such buses. Furthermore, assuming that the node 4(a) has an aggregate capacity pool of e.g. 10 Gbps for forwarding packets from the buses 9(a1) and 9(a2) towards its egress-direction external interface(s) 3(tx), both the buses 9(a1) and 9(a2) can have a full 10 Gbps capacity pool to allocate among the source nodes 11 on each bus. The node 4(a) can then perform prioritized packet-forwarding with statistical multiplexing to forward the packets arrived to it on the buses 9(a1) and 9(a2) on to its external interface(s) 3(tx), thereby maximizing the effective utilization of the buses 9(a1) and 9(a2) and the external interface(s) 3(tx).

DESCRIPTION OF PREFERRED EMBODIMENT

The subject matter of the present invention is a network system 1 using buses 9 of FIG. 1 for transporting packet data among a set of packet-switching, -forwarding or -routing nodes 4. Practical system engineering specifications for a preferred embodiment of such bus 9 is provided with the referenced patent applications as detailed below.

The invention of this patent applications is related to the disclosures of the referenced patent applications [1]-[6], which provide more background and application description for the present invention, and more detailed engineering specifications for a practical system implementation. The relationship between the referenced patent application and the current patent application is summarized below.

The referenced patent application [1] provides a generic network level method for packet traffic load adaptive allocation of transport network capacity. That method is herein amended with specifications for an independently operating packet transport bus 9 that enables a restriction-free support for partial and spanning mesh topologies. The current application also provides detail specifications for the network control signaling i.e. for the bus 9 control signaling process.

The referenced patent application [2] provides product specifications for a practical network appliance that utilizes concepts of the present invention.

The referenced patent application [3] provides system engineering specifications for a preferred implementation of the present invention.

The referenced patent application [4] provides a dynamic cross-connect mechanism used in a preferred implementation of a network system 1 utilizing concepts of the present invention.

The referenced patent application [5] provides a simple, fast and efficient packet forwarding scheme used in a preferred implementation of a network system 1 utilizing concepts of the present invention.

The referenced patent application [6] provides amended system engineering specifications for a preferred implementation of the present invention, plus a number of practical application examples.

In particular, Appendix B of the referenced provisional patent application [3], with the amendments of Appendix A of the referenced provisional patent application [6], provide detailed system engineering specifications for a preferred practical implementation of the packet transport bus 9 of the present invention. A mapping between acronyms used in the referenced patent applications [3] and [6] and the more general terms and acronyms used herein is provided below:

| | |
|---|---|
| ABI | node 4 |
| ACP | bus control payload 39 |
| AMB | L1 connection 6 between nodes 4 on a bus 9 |
| BAM | bus capacity allocation vector 15, 16 |
| BC | bus control process cycle |
| BCR | bus capacity request figure 14 |
| ITN | network system 1, packet transport network comprising buses 9 |
| IM | interface unit 4 of network system 1 |

The system specifications in the referenced provisional patent applications [3] and [6] relate to an application of the currently preferred embodiment in an environment where the network system 1, based on buses 9, delivers MPLS packets among MPLS label edge routers or switches. While Appendix B and Appendix A of the referenced patent applications [3] and [6], respectively, provide detail specifications for a particular practical implementation of the present invention, the chapters of those specifications describing the dynamic channelization of the bus 9 into source node specific connections 6, i.e. the bus capacity allocation process, are rewritten in the following in a more general form.

System Specifications

A network system 1 based on buses 9 provides packet-layer transparent forwarding and transport of multi-protocol packet traffic with optimized network throughput. The functionality of network system 1 consists of bus 9 data-plane and control-plane functionality. The bus data plane consists of packet forwarding and transport over virtual concatenated VC-3-Xv channels 6 between external interface units 4 of network system 1. The bus control plane dynamically maximizes the network 1 throughput for the part of that bus 9 via optimizing every BC the bus capacity allocation pattern among the sources 11 of the bus 9. The control plane optimizes the bus capacity allocation pattern ($16(a)$-$16(d)$ for bus $9(e)$ in FIGS. 2 and 4) by modifying the concatenation coefficients X (=0,1,2, . . . ) for the source-specific virtual concatenated VC-3-Xv POS channels 6 (6(*a*)-6(*d*) in FIG. 2) according to the real-time packet traffic load i.e. bus capacity demand pattern (14(*a*)-14(*d*) for bus 9(*e*) in FIGS. 2 and 5) presented by the sources 11 on the bus 9. The bus 9 is described in the following in two parts: 1) the bus 9 data plane; and 2) the bus 9 control plane.

Bus 9 Data-Plane:

Network system 1 packet forwarding plane supports efficient packet multicasting, anycasting, dynamic traffic load balancing, route optimization, prioritization, and fast packet-level traffic protection in addition to conventional unicasting, as per the specifications in the referenced patent applications [3] and [5] and [6]. The VC-3-Xv POS transport connections 6 on buses 9 of network system 1 provide optimally sized (in multiples of VC-3 timeslots, adjusted every BC) channels for transporting packets across standard SDH/SONET/WDM networks, between packet forwarding nodes 4, without intermediate packet processing or switching points that would increase delay, jitter and packet loss rate. Thereby, bus 9 data plane, with its integrated real-time control plane, achieves maximum bandwidth efficiency with maximum network performance and throughput, while improving network scalability as it requires packet-level processing only for the lower rate network system 1 access interfaces 3, and not for the higher-rate backbone interfaces.

Bus 9 Control-Plane:

The real-time control plane of network system 1 is implemented in a distributed fashion, so that the control plane process at each node 4 within the network system 1 independently performs the capacity allocation optimization among the source node specific channels 6 from remote source nodes 4 of the network system 1 on MxVC-3 multi-source buses 9 on which it is the destination. The destination node 4 of each such multi-source MxVC-3 bus 9 allocates the M (an arbitrary integer number of) VC-3 timeslots among the set of source nodes 4 on each bus 9 every BC based on the capacity requests 14 by the source nodes 11 of each bus 9. A node 4 transmits a capacity request 14 (a requested number of VC-3 slots on a bus 9) every BC for the destination node 10 of each bus 9 on which it is a source 11, based on the amount of data queued in a buffer at that node 4 for future delivery toward the individual destination nodes 10.

The control plane of bus 9 is responsible for continuously optimizing the utilization of the bus 9 and thereby maximizing the network system 1 throughput for the part of the network egress port to where the bus 9 transports data. Thus, e.g. N (an integer number of) buses 9 configured in full-mesh continuously maximize the global throughput of data traffic delivered through such a network 1 of N access points 3 (FIG. 6). The control plane of bus 9 maximizes the throughput of bus 9 via cyclically optimizing the bus capacity (M VC-3s) allocation pattern (16(*a*) through 16(*d*) in FIG. 2) among the source nodes 11 of the bus 9. Each source node 11 has a VC-3-Xv (X=0,1,2 . . . ) POS connection 6 on the bus 9 to the destination node 10 of the bus 9. The bus 9 control plane assigns a new set of concatenation coefficients (parameters X) for the source nodes 11 of the bus 9 for every new bus control process cycle (BC, 1 ms in a currently preferred embodiment) based on the traffic loads 14 the individual source nodes 11 had at the end of the previous BC towards the destination node 10 of the bus 9, so that the sum of the parameters X is always equal to the number (M) of VC-3s on the bus 9.

Control Plane Process Cycle:

The bus 9 control plane process cycle is detailed below, proceeding in order from the capacity demand FIG. 14 generation to the execution of capacity allocation vectors 16, with the sub-processes as follows:

a) Generation of bus capacity demand FIGS. 14 (an integer number of requested VC-3 i.e. STS-1 timeslots). Performed by quantifying the data traffic loads from the individual source nodes 11 of the bus 9 toward the destination 10 of the bus in bus capacity allocation units to form the bus capacity demand FIGS. 14 associated with said sources;

b) Generation of bus capacity allocation vectors 15. The bus 9 capacity allocation algorithm i.e. computation of capacity allocation vectors 15 at the destination node 4 based on the capacity demand FIGS. 14 by the source nodes 4;

c) Bus 9 control information signaling. Includes transfer of capacity demand info 14, capacity allocation info 15, 16 and bus cycle synchronization among the source and the destination nodes 4 of the bus 9 using a control payload 39, as described earlier regarding FIGS. 2-5;

d) Execution of the capacity allocation info 16 at the source nodes 11. Synchronized by the bus control payload 39 transmitted by the EOB source node 13 of the bus 9; the bus control payload 39 carries the source node 11 specific capacity allocation vectors 16, which the EOB node 13 received from the destination node 10 of the bus 9 as first-pass capacity allocation info 15 (FIGS. 2 and 3).

A detail specification for the sub-process b) capacity allocation algorithm of the above bus control process cycle in a preferred embodiment is provided below:

The bus capacity allocation units for the next process cycle are allocated, starting from a revolving, i.e. once-per-BC-shifting, source node 11, one bus capacity allocation unit at a time per each source node whose bus capacity demand FIG. 14 (which also is expressed as an integer multiple of bus capacity allocation units) is greater than the amount of capacity allocation units so far allocated to it, until all the capacity allocation units are allocated, or until the capacity demand figures by all the source nodes 11 of the bus 9 have been matched, whichever comes first. In case the there still remain unallocated bus capacity allocation units after the capacity demand 14 by each source node of the bus has been matched, the bus capacity allocation algorithm continues to allocate the remaining capacity allocation units among the source nodes of the bus according to its regular rotating order until all the capacity allocation units, i.e. the aggregate bus capacity for the next bus process cycle, have been allocated.

It can be seen that the above specified algorithm achieves the below two goals that improve the network data throughput and QoS:

i) it minimizes the aggregate amount of unmatched demand 14 by the source nodes 11 of the bus 9 left after the allocation of the bus capacity, and ii) it ensure fairness in capacity allocation among the source nodes 11 of the bus 9. By that algorithm, each source node gets bandwidth on the bus worth its demand 14, up to its fair share of bus capacity i.e. the bus capacity divided by the number of its source nodes. Additionally, in cases when the aggregate demand (sum of the demand FIGS. 14 by all the sources 11 of the bus 9) exceeds the total bus capacity, the algorithm ensures that no such source node whose demand FIG. 14 could not be fully matched gets less capacity than any other source node, with the exception of potential minor quantification inaccuracies unavoidable due to the granularity (e.g. one STS-1) of the bus (e.g. a pool of 192 STA-1s) capacity allocation.

Once the bus capacity allocation units, such as STS-1 timeslots on an STS-N bus 9, have been allocated among the sources 11 of the bus 9 for the algorithm period i.e. BC as per the above algorithm, the source node specific capacity allocation vectors 15 are formed in a preferred embodiment so that the furthermost (i.e. EOB) source node 13 is assigned the number of bus capacity allocation units, called channel resources that can be TDM or WDM channels (such as STS-1 timeslots, or wavelengths), allocated to it on the bus 9 for the next BC in a continuous fashion, starting from channel resource #0 (STS-1 #0 on an STS-N bus 9), the second furthermost source node (4(b) in FIG. 2 for bus 9(e)) is assigned the next channels resources, and so on, until the highest bus channel# (STS-1 #192 on an STS-192 bus 9) unit is assigned. Each bus channel resource, such as a TDM (e.g. STS-1) timeslot or a WDM wavelength, assigned to a source node 11 is marked by setting the corresponding bit (e.g. bit 191 for STS-1 #191 in FIG. 5) in the capacity allocation vector 15 associated with the source node. The result is a table 31 (FIG. 3) of source-node-specific M-bit (for a bus 9 comprising M (an integer) capacity allocation units i.e. channel resources) capacity allocation vectors 15, wherein each bit b (b=1,2, ... M) is set at exactly one of the vectors 15 in the table 31.

Conclusions

This detailed description is a description of a currently preferred embodiment of the present invention for application examples discussed in the foregoing. Specific architectural and logic implementation examples are provided in this and the referenced patent applications for the purpose illustrating a currently preferred practical implementation of the invented concept. Naturally, there are multiple alternative ways to implement or utilize, in whole or in part, the principles of the invention as set forth in the foregoing. Therefore, those skilled in the art will be able to develop different versions and various modifications of the described embodiments, which, although not necessarily each explicitly described herein individually, utilize the principles of the present invention, and are thus included within its spirit and scope. For instance, while this detailed description has used consistently STS-1 or VC-3 path as the basic capacity allocation unit, mapping the concept of the invented capacity allocation method for various other potential units of capacity allocation, including but not limited to SONET STS-3c/12c/48c/192c, VT-1.5/2/6 paths or SDH VC-11/12/2/3/4(-Xc) (X is an integer) paths, or wavelengths in WDM system, will be obvious for those skilled in the art. It is thus intended that the specification and examples be considered as exemplary only, with a true scope of the invention being indicated by the following claims.

What is claimed is:

1. A network system for maximizing its data throughput by adjusting its connection capacities according to their capacity demand variations, the network system comprising:
    a set of nodes including one or more source nodes and a destination node, each source node having a capacity demand figure toward the destination node,
    a logical data transport bus, referred to as a bus, configured to transfer data packets from the source nodes to the destination node, the bus having an aggregate capacity that can be channelized to source node specific connections, which have an adjustable data transport capacity and each of which transports data packets from its source node to the destination node without packet-layer processing in between its source node and the destination node, and
    digital logic at the destination node configured to allocate the aggregate capacity of the bus among its source nodes by adjusting the capacities of the source node specific connections on the bus at least in part based on the capacity demand figures from the source nodes toward the destination node of the network system.

2. The network system of claim 1 wherein a node can be a source node on more than one bus, and a destination node on more than one bus.

3. The network system of claim 2 wherein each individual bus on which the same node is the destination node operates independently.

4. The network system of claim 2 further providing means for supporting functioning network architectures such that where a set of nodes that are sources on the same bus or on buses that have the same destination node may be but are not required to be sources on buses on which the member nodes of said set are the destinations.

5. The network system of claim 1 wherein the bus comprises a collection of SDH VC-n or VC-n-Xc paths, or SONET STS-1 or STS-1-Xc paths, wherein VC-n is an SDH standard virtual container type, such as VC-11, VC-12, VC-2, VC-3 or VC-4, and X is an integer.

6. The network system of claim 1 wherein the source node specific connections on the bus are virtual concatenated SDH VC-n-Xv or SONET STS-1-Xv paths, wherein VC-n is an SDH virtual container type, such as VC-11, VC-12, VC-2, VC-3 or VC-4, and X is an integer referred to as concatenation coefficient.

7. The network system of claim 6 wherein the network system adjusts the capacities of the source node specific connections by modifying the values of the concatenation coefficients associated with said connections.

8. The network system of claim 1, wherein at least one of the source node specific connections can get capacity up to the aggregate bus capacity.

9. The network system of claim 1, wherein any one of the source node specific connections can get capacity up to the aggregate bus capacity.

10. The network system of claim 1, wherein a source node specific connection gets capacity up to the aggregate bus capacity when i) the bus capacity demand by the source node of said connection equals or exceeds the aggregate bus capacity, and ii) the bus capacity demand by the other source nodes of the bus is zero.

11. The network system of claim 1, wherein the sum of the capacities of the individual source specific connections is always equal to the aggregate capacity of the bus.

12. The network system of claim 1, wherein each such source node specific connection whose associated bus capacity demand figure equals or exceeds its fair share of the bus capacity gets its fair share of the aggregate bus capacity.

13. The network system of claim 1, wherein a source node specific connection gets its fair share of the aggregate bus capacity whenever the bus capacity demand figure by the source node of said connection equals or exceeds its fair share of the bus capacity.

14. The network system of claim 13, wherein the aggregate bus capacity, a fair share of the bus capacity, and the bus capacity demand figures by the source nodes are measurable in data bytes per a period of time.

15. The network system of claim 14, wherein the fair share of the bus capacity is the aggregate bus capacity divided by the number of source nodes on the bus.

16. The network system of claim 14, wherein a fair share of the bus capacity for a source node of the bus is the smaller of: i) aggregate bus capacity divided by the number of source nodes on the bus ii) the maximum bus capacity demand figure by the source node.

17. The network system of claim 16, wherein the network system allocates the bus capacity among the source nodes of the bus according to the below set of rules:
   a) connection from any such source node whose bus capacity demand figure is less than its fair share of the bus capacity gets bus capacity at least worth its demand;
   b) connection from any such source node whose bus capacity demand figure is equal to or greater than its fair share of the aggregate bus capacity gets bus capacity at least worth its fair share;
   c) after the rules a) and b) have been satisfied, any remainder of the aggregate bus capacity is allocated to those source node specific connections whose associated capacity demand figures exceed the capacity so far allocated to said connections, so as to match the capacity demand of as many of the source nodes as possible.

18. The network system of claim 17 wherein the bus capacity is allocated via assigning a variable number of bus capacity allocation units to each source node specific connection.

19. The network system of claim 18 wherein the bus capacity allocation unit is an SDH VC-n or VC-n-Xc path or a SONET STS-1 or STS-1-Xc path, wherein VC-n is an SDH virtual container type, such as VC-11, VC-12, VC-2, VC-3 or VC-4, and X is an integer.

20. A method for allocating a total data transport bandwidth on a data packet transport bus referred to as a bus, said bus having two or more data sources and a destination, said bus further providing source-specific variable-bandwidth channels from the individual sources of the bus to the destination of the bus for transporting data packets from the individual sources to the destination of the bus, the sources of the bus having their associated data traffic loads toward the destination of the bus, the method executed periodically once per a period of time referred to as an algorithm period, the method comprising:
   allocating, by the destination of the bus, said total bus bandwidth among said individual sources based at least in part on the traffic loads associated with the individual sources of the bus,
   assigning, by the destination of the bus, units of bus bandwidth for the source-specific channels on the bus according to the allocating of the bus bandwidth, and
   transporting data packets over the bus from the source nodes to the destination node based on the assigning of units of bus bandwidth for the source-specific channels.

21. The method of claim 20, wherein the total bus bandwidth is allocated among the sources of the bus via assigning a variable number of bus bandwidth allocation units per each source.

22. The method of claim 21 wherein a fair share of bus bandwidth for a data source of the bus is defined as the lesser of:
   a) the total bus bandwidth divided by the number of data sources on the bus;
   b) the maximum possible traffic load associated with the source, or as either one of a) or b) if the two are equal.

23. The method of claim 22 wherein the total bus bandwidth, the traffic loads associated with data sources, the fair share of bus bandwidth per a source, and the bus bandwidth allocation units are quantifiable for the algorithm period in data bytes.

24. The method of claim 23 wherein the total bus bandwidth, the traffic loads associated with the data sources, and the fair share of bus bandwidth per a source are quantified for the execution of the algorithm in bandwidth allocation units.

25. The method of claim 24 wherein the total bus bandwidth is allocated among the sources of the bus in the following fashion:
   a) the bus bandwidth allocation units are allocated in a rotating fashion, one unit at a time, to such sources of the bus whose associated traffic load exceeds the amount of bus bandwidth units so far allocated to them, as long as there are sources whose associated traffic load is greater than the amount of bus bandwidth units so far allocated to them;
   b) any bus bandwidth units still unallocated after step a) are allocated in a rotating fashion, one unit at a time, among all sources of the bus until all the bus bandwidth allocation units are allocated for the algorithm period.

26. The method of claim 25 wherein the bus bandwidth allocation is started from a revolving data source of the bus, so that the data source on which the allocation is started shifts by one step for every new algorithm period.

27. The method of claim 21 wherein the data transport bus comprises two or more SDH VC-n or SONET STS-1 paths, and wherein the unit of capacity allocation is an SDH VC-n or VC-n-Xc path or timeslot, or a SONET STS-1 or STS-1-Xc path or timeslot, wherein VC-n is an SDH virtual container type, such as VC-11, VC-12, VC-2, VC-3 or VC-4, and X is an integer.

28. The method of claim 27 wherein the algorithm period is an integer multiple of SDH/SONET frame periods, which nominally are 125 microseconds in duration.

29. A process for optimizing capacity allocation within a data transport network system referred to as a network system, the network system comprising a set of ingress interfaces, an egress interface, and a capacity pool for transporting data packets from the set of ingress interfaces to the egress interface of the network system, the process having a repeating process cycle, each process cycle comprising the steps:
   optimizing, by the egress interface, allocation of said capacity pool among the individual ingress interfaces for transport of data packets from the ingress interfaces to the egress interface based at least in part on demand for network capacity by the individual ingress interfaces for transporting data from them to the egress interface of the network system,
   assigning, by the egress interface, units of capacity within said capacity pool to said individual ingress interfaces according to the optimizing of capacity allocation, and
   transporting data packets from the ingress interfaces nodes to the egress interface based on the assigning of units of capacity within said capacity pool.

30. The process of claim 29 wherein the repeating process cycle includes the below sub-processes:
   a) determining the demand for network capacity from the individual ingress interfaces to the egress interface of the network system;
   b) allocating the pool of network capacity among the ingress interfaces of the network system;
   c) distributing the capacity demand and capacity allocation information between the ingress interfaces and the egress interface of the network system;
   d) synchronized execution of the capacity allocation information by the ingress interfaces of the network system.

31. The process of claim 30 wherein with the sub-process a) the demand for network capacity from an individual ingress interface to the egress interface of the network is determined at least in part based on an amount of data bytes queued in a buffer for future transport from said ingress interface to the egress interface of the network system.

32. The process of claim 30 wherein with the sub-process b) the allocation of the pool of network capacity among the ingress interfaces is done according to an algorithm that i) minimizes any unmatched demand remaining after the pool is allocated, and ii) ensures fairness in capacity allocation among the individual ingress interfaces of the network system.

33. The process of claim 32 wherein the capacity allocation fairness is defined as follows:
 1) in case aggregate demand for capacity by the ingress interfaces does not exceed the pool capacity, each ingress interface gets capacity worth is demand, and any remainder of the pool of network capacity is divided evenly among all the ingress interfaces;
 2) in case aggregate demand for capacity by the ingress interfaces exceeds the pool capacity, the pool capacity is allocated among the ingress interfaces according to the following rule: no ingress interface whose capacity demand is not fully matched shall be allocated less capacity than any other ingress interface, except for potential quantification inaccuracies resulting from granularity of capacity allocation.

34. The process of claim 30 wherein the pool of network capacity is provided by a data transport bus, referred to as a bus, which is capable of transporting data packets from the ingress interfaces to the egress interfaces of the network system, and wherein the furthermost ingress interface of said bus is referred to as end-of-bus ingress interface, and the other ingress interfaces referred to as downstream ingress interfaces.

35. The process of claim 34 wherein the egress interface of the network system can be an ingress interface on another network system, and wherein an ingress interface of the network system can be an egress interface of another network system.

36. The process of claim 35 wherein with the sub-processes c) and d) the distribution of the capacity demand and allocation info and synchronization of the execution of the capacity allocation info is performed according to a signaling scheme as set forth below:
 1) the capacity allocation info is transferred from the egress interface to the end-of-bus ingress interface of the studied network system on another network system on which the egress interface of the studied network system is an ingress interface, and whose egress interface is the end-of-bus ingress interface of the studied network system;
 2) said end-of-bus ingress interface transmits on a pre-defined phase at each of its self-timed process cycle period said capacity allocation info on the bus of the studied network system using a specially marked data frame referred to as control payload;
 3) the individual downstream ingress interfaces along said bus i) copy their related capacity allocation info from the control payload, ii) insert their capacity demand info into the control payload, iii) and synchronize their local bus process cycle timers to said pre-defined bus process cycle phase on which the control payload nominally travels on the bus;
 4) at the beginning of the next process cycle on the bus, as timed by the bus process cycle timers of the ingress interfaces of the bus, all of which are synchronized to the phase of the timer of the end-of-bus ingress interface as per iii) of step 3), the ingress interfaces of the bus in synchrony execute their capacity allocation info that they copied from the control payload that traveled on the bus on the previous bus process cycle;
 5) as the control payload reaches the egress interface of the studied network system, that egress interface copies from the control payload the capacity demand info inserted into the control payload by the ingress interfaces of the network system, and based at least in part on that set of capacity demand info, computes a new bus capacity allocation for a new process cycle.

37. The process of claim 30 wherein the pool of network capacity can be presented as a parallel array of two or more capacity allocation units.

38. The process of claim 37 wherein the capacity demand information by an ingress interface is presented as an integer number of capacity allocation units that provide a minimum sufficient capacity for transporting any data queued at the ingress interface unit for future transport toward the egress interface unit.

39. The process of claim 37 wherein the capacity allocation info per an ingress interface of the network system is presentable as a logic bit vector specifying which ones of the capacity allocation units of the capacity pool are assigned to that particular ingress interface for the next process cycle.

40. The process of claim 37 wherein the capacity allocation units are SDH VC-n or VC-n-Xc, or SONET STS-1 or STS-1-Xc paths, wherein VC-n is an SDH virtual container type, such as VC-11, VC-12, VC-2, VC-3 or VC-4, and X is an integer.

41. The process of claim 40 wherein the SDH/SONET paths assigned to the individual ingress interfaces of the network system are virtual-concatenated per an ingress interface to form a variable-bandwidth packet-over-SDH/SONET connection from each one of the individual ingress interfaces to the egress interface of the network system.

* * * * *

UNITED STATES PATENT AND TRADEMARK OFFICE
CERTIFICATE OF CORRECTION

PATENT NO.        : 7,333,511 B2                                         Page 1 of 1
APPLICATION NO.   : 10/230698
DATED             : February 19, 2008
INVENTOR(S)       : Mark Henrik Sandstrom It is certified that error appears in the above-identified patent and that said Letters Patent is hereby corrected as shown below:

In column 20, line 2, please change "algorithm" to "method"

Signed and Sealed this

Tenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,333,511 B2
APPLICATION NO. : 10/230698
DATED : February 19, 2008
INVENTOR(S) : Mark Henrik Sandstrom Page 1 of 1

It is certified that error appears in the above-identified patent and that said Letters Patent is hereby corrected as shown below:

Column 20, line 51, claim 29: delete the word "nodes".

Signed and Sealed this
Fifth Day of February, 2013

Teresa Stanek Rea
*Acting Director of the United States Patent and Trademark Office*